United States Patent
Hsu

(10) Patent No.: US 11,861,492 B1
(45) Date of Patent: Jan. 2, 2024

(54) QUANTIZING TRAINED NEURAL NETWORKS WITH REMOVAL OF NORMALIZATION

(71) Applicant: Cadence Design Systems, Inc., San Jose, CA (US)

(72) Inventor: Ming Kai Hsu, Fremont, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 836 days.

(21) Appl. No.: 16/727,629

(22) Filed: Dec. 26, 2019

(51) Int. Cl.
*G10L 15/00* (2013.01)
*G06N 3/08* (2023.01)
*G06N 3/04* (2023.01)

(52) U.S. Cl.
CPC ............... *G06N 3/08* (2013.01); *G06N 3/04* (2013.01)

(58) Field of Classification Search
CPC ............ G06N 3/08; G10L 15/22; G10L 19/00
See application file for complete search history.

(56) References Cited

U.S. PATENT DOCUMENTS

2018/0315399 A1* 11/2018 Kaul .................... G06F 9/30014
2018/0349758 A1* 12/2018 Pan ......................... G06N 3/063
2019/0042945 A1* 2/2019 Majumdar ............. G06N 3/045

OTHER PUBLICATIONS

D. D. Lin, S. S. Talathi, and V. S. Annapureddy, 'Fixed Point Quantization of Deep Convolutional Networks'. arXiv, 2015. (Year: 2015).*
C. Chen, H. Ding, H. Peng, H. Zhu, Y. Wang and C. .-J. R. Shi, "OCEAN: An On-Chip Incremental-Learning Enhanced Artificial Neural Network Processor With Multiple Gated-Recurrent-Unit Accelerators," in IEEE Journal on Emerging and Selected Topics in Circuits and Systems, 2018. (Year: 2018).*
S. Ioffe and C. Szegedy, 'Batch Normalization: Accelerating Deep Network Training by Reducing Internal Covariate Shift'. arXiv, 2015. (Year: 2015).*

* cited by examiner

*Primary Examiner* — Bhavesh M Mehta
*Assistant Examiner* — Uthej Kunamneni
(74) *Attorney, Agent, or Firm* — Schwegman Lundberg & Woessner, P.A.

(57) ABSTRACT

Various embodiments provide for quantizing a trained neural network with removal of normalization with respect to at least one layer of the quantized neural network, such as a quantized multiple fan-in layer (e.g., element-wise add or sum layer).

20 Claims, 6 Drawing Sheets

QUANTIZING TRAINED NEURAL NETWORKS WITH REMOVAL OF NORMALIZATION

TECHNICAL FIELD

Embodiments described herein relate to neutral networks and, more particularly, to systems, methods, devices, and instructions for quantizing neural networks with removal of normalization, which can be used in compiling a neural network into code executable by a target hardware processor, such as a digital signal processor (DSP).

BACKGROUND

Training a machine learning (ML) model, such as a neural network (or neural network model), can enable a computer system to extract features from training data (e.g., training image data) and generate a trained model, which can subsequently be used to process and extract features from new data (e.g., new image data). With respect to neural networks, (trained) models that implement trained neural networks often process data in a floating-point domain (e.g., using 32-bit floating point data) and, as floating point, such trained models can be computationally expensive to operate on a general-purpose processor (e.g., central processing units (CPUs)).

To address this issue, specialized processors, such as digital signal processors (DSPs) and Neural Processing Units (NPUs), have been developed to execute quantized versions of neural networks. With quantization of a neural network that is in floating point (e.g., 32-bit floating-point neural network), the neural network can be converted to a neural network that is in a fixed-point domain (e.g., N-bit fixed-point neural network). Generally, within a fixed-point neural network, normalization is used in each layer where the range of input values (e.g., the input layer activation or input activation) of the layer is different from the range of output values (e.g., the output layer activation or output activation) of the layer. Additionally, in fixed-point neural networks, normalization is used with respect to a quantized multiple fan-in layer when the quantized multiple fan-in layer receives inputs from preceding layers that have different output value ranges (e.g., different output activations). The normalization can be implemented as a standalone layer, or made a part of a layer (e.g., made a part of a multiple fan-in layer).

Unfortunately, each normalization included in a fixed-point neural network results in additional computation (which lowers performance of the fixed-point neural network) and additional quantization parameters being loaded to memory (which means more memory is being used). Though conventional techniques for removing normalization from a fixed-point neural network do exist, their approaches do raise issues, such as introducing large differences in layer value ranges (e.g., layer activations) and the introduction of extra quantization loss (which can have a large overall impact on the network).

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
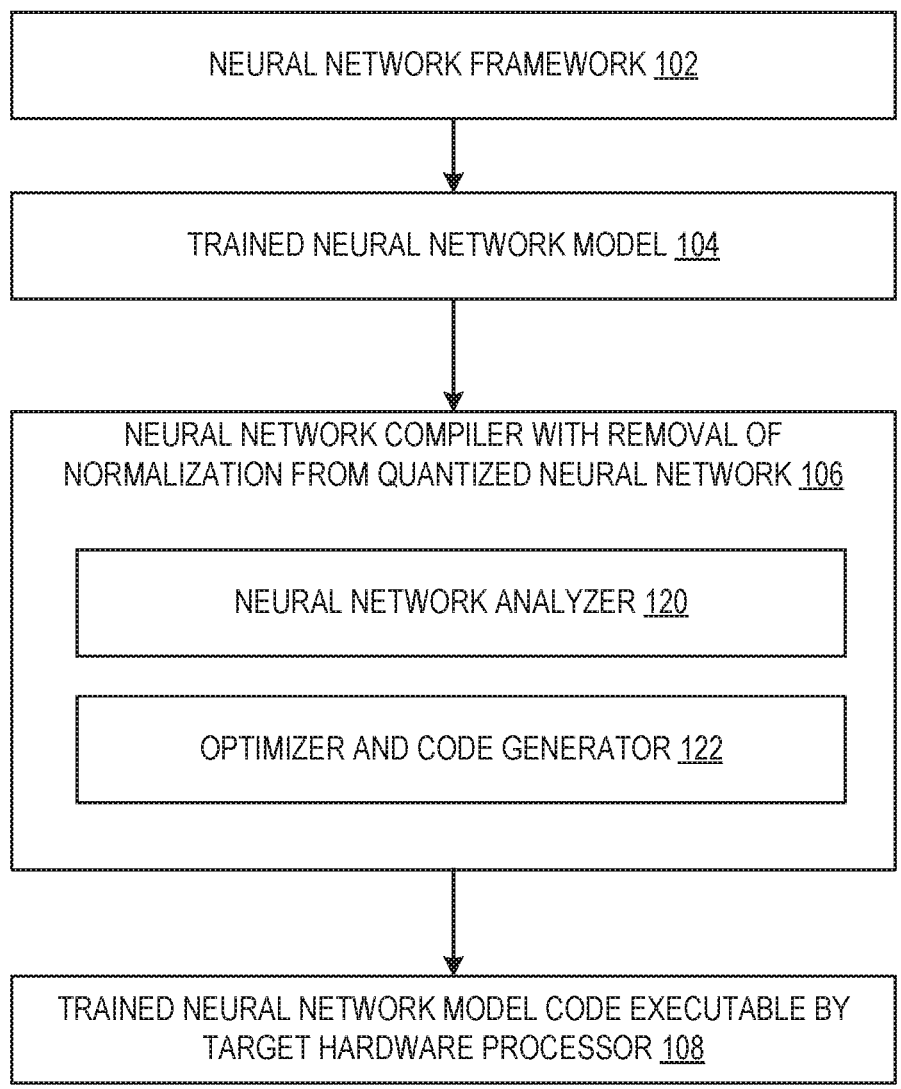
FIG. 1 is a diagram illustrating an example flow for compiling a neural network based on quantizing the neural network with removal of normalization, according to some embodiments.

Various embodiments provide for quantization of a trained neural network with removal of normalization, which represents an improvement over conventional methodologies for removing normalization from a quantized neural network (e.g., fixed-point neural network). In particular, various embodiments provide for quantizing a trained neural network with removal of normalization with respect to at least one layer of the quantized neural network, such as a quantized multiple fan-in layer. Additionally, some embodiments provide for generating executable code from the resulting quantized trained neural network, where the executable code is executable by a target hardware processor, such as a specialized processor (e.g., a digital signal processor (DSP) or a Neural Processor Unit (NPU)), to operate the quantized trained neural network on the target hardware processor. Depending on the embodiment, the trained neural network (that can be quantized by an embodiment) can comprise a trained neural network generated by one of a variety of neural network frameworks, such as Caffe (developed by Berkeley AI Research at the University of California, Berkley), TensorFlow (by GOOGLE), PyTorch (by Facebook), etc. A quantized multiple fan-in layer can include, without limitation, an element-wise (eltwise) add or sum layer.

By use of various embodiments described herein, certain normalizations can be removed from a quantized neural network while avoiding issues raised by conventional methods of removing normalization, such as introducing large differences in layer value ranges or the introduction of extra quantization loss. Additionally, use of various embodiments described herein can result in improved precision for both projection and identity mappings within the quantized neural network.

According to some embodiments, with respect to a residual block of a quantized neural network, a normalization is removed with respect to a quantized multiple fan-in layer included by the residual block in different cases, and the method for removal of normalization can differ between cases. For instance, normalization can be removed with respect to a quantized multiple fan-in layer of a residual block where the residual block implements a projection mapping within the quantized neural network. An example projection mapping case is described herein with respect to FIG. 3.

In another instance, normalization can be removed with respect to a quantized multiple fan-in layer of a residual block where the residual block implements (within the quantized neural network) an identity mapping where an empirical value received by the first quantized multiple fan-in layer from a preceding quantized multiple fan-in layer (e.g., of another residual block) is equal to or greater than the empirical value of the second input of the first quantized multiple fan-in layer. In yet another instance, normalization can be removed with respect to a quantized multiple fan-in layer of a residual block where the residual block implements (within the quantized neural network) an identity mapping where an empirical value received by the first quantized multiple fan-in layer from a preceding quantized multiple fan-in layer (e.g., of another residual block) is smaller than the empirical value of the second input of the first quantized multiple fan-in layer. An example identity mapping case is described herein with respect to FIG. 4.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a diagram illustrating an example flow 100 for compiling a neural network based on quantizing the neural network with removal of normalization, according to some embodiments. As shown, the neural network compilation flow 100 involves a neural network framework 102, a trained neural network model 104, a neural network compiler with removal of normalization from quantized neural network 106 (hereafter, neural network compiler 106), and trained neural network model code executable by target hardware processor 108 (hereafter, trained neural network model code 108). According to various embodiments, the neural network compilation flow 100 compiles the trained neural network model 104, generated by the neural network framework 102, into the trained neural network model code 108 using the neural network compiler 106. For some embodiments, a flow for compiling a neural network code into executable model code differs (e.g., in operation or phases) from what is illustrated by FIG. 1. The neural network framework 102, the neural network compiler 106, or both can be implemented using one or more processors (e.g., by configuring such one or more computer processors to perform functions described for that component) and hence can include one or more of the processors. Furthermore, the neural network framework 102 and the neural network compiler 106 can be implemented together or separately within a single machine, database, or device or may be distributed across multiple machines, databases, or devices.

For some embodiments, the neural network framework 102 comprises a framework configured to generate a neural network, such as a convolution neural network (CNN), a recurrent neural network (RNN), a deep learning neural network (DNN), or the like, and facilitate the training of the neutral network, which generates a model that implements the trained neural network (i.e., trained neural network model). The trained neural network model 104 represents an example of a trained neural network model generated by the neural network framework 102, and comprises data describing the trained neural network. For some embodiments, a trained neural network model generated by the neural network framework 102 (e.g., the trained neural network model 104) implements a trained neural network comprising one or more layers that process data in a floating-point domain (hereafter, referred to as floating-point layers). Within a neural network, a floating-point layer can receive (e.g., from a preceding layer) one or more floating-point values, or can output (e.g., to a succeeding layer) one or more floating-point values. As used herein, a floating-point neural network can refer to a neural network that comprises as least one floating-point layer.

The neural network compiler 106 accesses the trained neural network model 104 (e.g., accesses model data for the trained neural network model 104) and generates the trained neural network model code 108. For some embodiments, the trained neural network model code 108 comprises code (e.g., instruction data) executable by a target hardware processor, such as a DSP or an NPU, to operate the quantized neural network on the target hardware processor. To do so, the neural network compiler 106 of various embodiments quantizes a floating-point neural network, implemented by the trained neural network model 104, and uses the quantized neural network to generate the trained neural network model code 108. The quantized neural network represents a quantized implementation of the trained neural network implemented by the trained neural network model 104. To quantize a floating-point neural network, the neural network compiler 106 of some embodiments converts the floating-point neural network (which processes data in a floating-point domain) to a neural network that processes data in a fixed-point domain (hereafter, referred to as a fixed-point neural network). The resulting fixed-pointed neural network represents the quantized version of the floating-point neural network.

As used herein, a fixed-point neural network refers to a neural network that comprises one or more layers each of which outputs one or more fixed-point values (hereafter, referred to as fixed-point layers). Within a neural network, a fixed-point layer outputs (e.g., to a succeeding layer) one or more fixed-point values, and can receive (e.g., from a preceding layer) one or more fixed-point values. A fixed-point neural network can comprise multiple layers (e.g., fixed-point layers), and each layer of a fixed-point neural network can comprise one or more parameters (e.g., quantized parameters) or attributes that determine operation of that layer. The one or more parameters/attributes of a given layer can include, for example, a range of input values (also referred to herein as input value range or input layer activation) and a range of output values (also referred to herein as output value range or output layer activation) of the given layer. The value range of a fixed-point layer can be defined by fixed-point values. For instance, with respect to an example quantized multiple fan-in layer, the input value range can be defined as a minimum in of −23 for input 1 and −16 for input 2, and a maximum in of 46 for input 1 and 22 for input 2, while the output value range can be defined as a minimum out of 0 and a maximum out of 50. Example fixed-point layers can include, with limitation, element-wise (eltwise) sum layers, in-place layers, rectified linear unit (ReLu) layers, or convolution layers. For various embodiments described herein, normalization can be added or removed with respect to a layer of a neural network (e.g., fixed-point neural network) by updating (e.g., adjusting) the layer's one or more parameters/attributes, such as those that control the input value range or the output value range of the layer.

According to some embodiments, the neural network compiler 106 uses a methodology described herein for quantizing a trained neural network (e.g., implemented by the trained neural network model 104) with removal of normalization with respect to a layer of the quantized neutral network, such as a quantized multiple fan-in layer (e.g., element-wise add or sum layer). As shown, the neural network compiler 106 comprises a neural network analyzer 120 and an optimizer and code generator 122. Depending on the embodiment, a methodology described herein can be implemented by way of the neural network analyzer 120, the optimizer and code generator 122, or some combination of both.

For various embodiments, the neural network analyzer 120 implements conversion of a floating-point neural network (e.g., implemented by the trained neural network model 104) to a fixed-point neural network, while the optimizer and code generator 122 optimizes the fixed-point neural network and generates code executable by a target hardware processor (e.g., the trained neural network model code 108). During operation, the neural network analyzer 120 can analyze the floating-point neural network, which can include merging layers, fixed-point emulation, accuracy evaluation, or some combination thereof. The neural network analyzer 120 can generate an intermediate representation of a quantized neural network (e.g., fixed-point neural network) that represents a quantized version of the floating-point neural network. Based on the intermediate representation, the optimizer and code generator 122 can optimize the fixed-point neural network and generate the executable code. The executable code generated can be specifically targeted for execution by a processor of a certain make, model, or type. As described herein, examples of target hardware processors can include, without limitation, a DSP or a NPU. In generating the code, the optimizer and code generator 122 can use a set of libraries code libraries) compatible with the target hardware processor.

To remove normalization with respect to a given layer of a quantized neural network (e.g., fixed-point neural network), the neural network compiler 106 of some embodiments can first determine whether the given layer meets a condition for normalization removal.

As one example of a condition for normalization removal with respect to a quantized multiple fan-in layer of a quantized neural network, if each of the preceding layers (coupled as inputs to the quantized multiple fan-in layer) has a fan-in of one, the neural network compiler 106 can remove a normalization of quantized multiple fan-in layer with respect to each of the preceding layers. Removing the normalization can comprise, for example, updating (e.g., adjusting) the output value range of one or all of the preceding layers, and can further comprise updating (e.g., adjusting) the input value range of the quantized multiple fan-in layer accordingly. For instance, where a first preceding layer and a second preceding layer are connected as inputs to a given quantized multiple fan-in layer, V1 represents the maximum output value of the first preceding layer, and V2 represents the maximum output value of the second preceding layer; each of the maximum output values V1 and V2 can be updated (e.g., adjusted or set) to be the maximum value of V1 and V2, as represented below (* denotes the updated maximum output value) by Example 1:

$$*V1 = \max(V1, V2)$$

$$*V2 = \max(V1, V2)$$

The maximum input value of the quantized multiple fan-out layer can be updated (e.g., adjusted or set) according to (e.g., to match) the update to one or both of the preceding layers. This represents an example of updating every input layer activation of the quantized multiple fan-in layer to the output layer activation of the preceding layers, where the first normalization is being skipped. An example case is described herein with respect to FIG. 3.

As another example of a condition for normalization removal with respect to a quantized multiple fan-in layer of a quantized neural network, if at least one preceding layer (coupled as an input to the quantized multiple fan-in layer) has a fan-out that is greater than one, normalization can be removed with respect to those preceding layers (coupled as inputs to the quantized multiple fan-in layer) having a fan-out of one. In this case, removing the normalization from preceding layers having a fan-out of one can comprise updating (e.g., adjusting) the output value range of these preceding layers based on the output value range of the preceding layer that has a fan-out greater than one. For instance, assume a first preceding multiple fan-out layer and a second single fan-out preceding layer are connected as inputs to a given quantized multiple fan-in layer, V3 represents the maximum output value of the first multiple fan-out preceding layer, V4 represents the maximum output value of the second single fan-out preceding layer, and V5 represents the maximum output value of the quantized multiple fan-in layer. Under a first example approach for normalization removal, V3 can remain unchanged (since the first multiple fan-out preceding layer has a fanout greater than one) and V4 can be updated adjusted or set) to match V3, as represented below (* denotes the updated maximum output value) by Example 2:

$$*V4 = V3$$

Under a second example approach for normalization removal, V3 can remain unchanged (since the first multiple fan-out preceding layer has a fanout greater than one) and V4 can be updated (e.g., adjusted or set) as follows by Example 3:

$$*V4 = V5$$

For both example approaches, the maximum input value of the quantized multiple fan-in layer can be updated (e.g., adjusted or set) according to (e.g., to match) the update to the second single-out preceding layer, Both the first approach and the second approach described above represent different examples of updating the input layer activation from single output fan-out layers to the quantized multiple fan-in layer based on input layer activation from a multiple fan-out layer to the quantized multiple fan-in layer. An example case is described herein with respect to FIG. 4.

In instances where, with respect to a quantized multiple fan-in layer of a quantized neural network, the number of fan-outs of all preceding layers and all succeeding layers is greater than one, the neural network compiler 106 can avoid removal of normalization.

Though the methodologies of various embodiments are described herein with respect to a neural network compiler, it will be understood that for some embodiments, the methodologies are implemented with respect to other (non-compiler) software applications or platforms.

Figure 2:
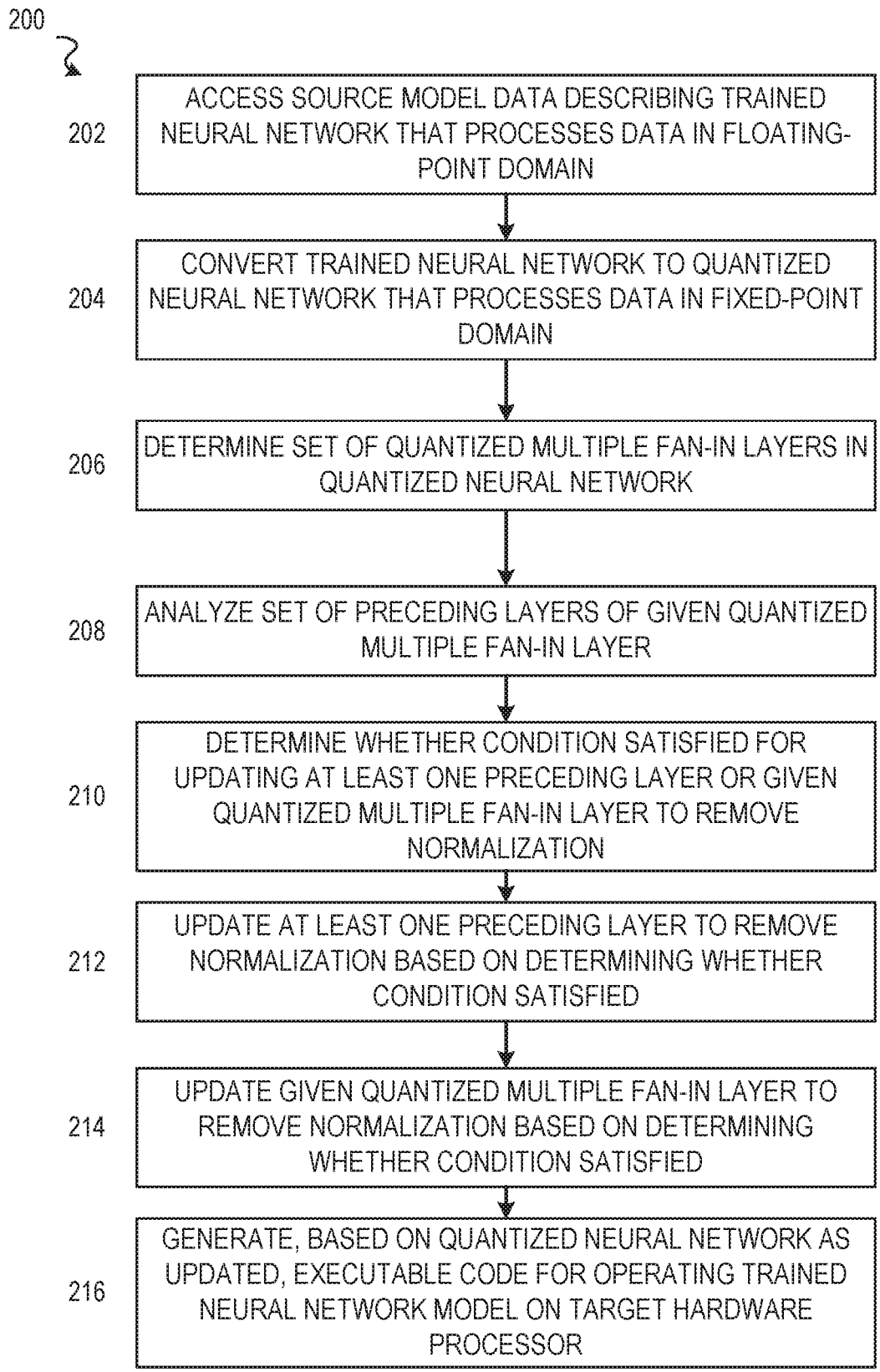
FIG. 2 is a flowchart illustrating an example method for quantizing a trained neural network with removal of normalization with respect to at least one layer of the quantized neural network, according to some embodiments.

FIG. 2 is a flowchart illustrating an example method 200 for quantizing a trained neural network with removal of normalization with respect to at least one layer of the quantized neural network, according to some embodiments. It will be understood that example methods described herein may be performed by a device, such as a computing device executing instructions of a neutral network compiler (e.g., the neural network compiler 106), in accordance with some embodiments. Additionally, example methods described herein may be implemented in the form of executable instructions stored on a computer-readable medium or in the form of electronic circuitry. For instance, the operations of the method 200 of FIG. 2 can be represented by executable instructions that, when executed by a processor of a computing device, cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

The method 200 as illustrated begins with operation 202 accessing source model data that describes a trained neural network that processes data in a floating-point domain (e.g., trained floating-point neural network), where the trained neural network comprises a set of floating-point layers. As described herein, the trained neural network can be one generated by an existing neural network framework, such as Caffe, TensorFlow, PyTorch, etc. Depending on the embodiment, the trained neural network can comprise a CNN, RNN, or a DNN The method 200 continues with operation 204 converting the trained neural network (described by the source model data accessed by operation 202) to a quantized neural network that processes data in a fixed-point domain (e.g., fixed-point neural network), where the quantized neural network comprises a set of fixed-point layers that corresponds to the set of floating-point layers. According to various embodiments, operation 204 facilitates the conversion by generating the quantized neural network based on the source model data accessed by operation 202.

Subsequently, operation 206 determines a set of quantized multiple fan-in layers in the quantized neural network. For some embodiments, the given quantized multiple fan-in layer comprises at least one element-wise sum layer. Additionally, for some embodiments, the given quantized multiple fan-in layer forms part of a residual block of the quantized neural network. As described herein, the quantized neural network can comprise multiple layers, and each layer can comprise one or more parameters (e.g., quantized parameters) or attributes that determine operation of the layer, such as an input value range (or activation) and an output value range of the layer or input scale and output scale. For various embodiments described herein, normalization can be added or removed with respect to a layer of a neural network (e.g., fixed-point neural network) by updating (e.g., adjusting) the layer's one or more parameters/attributes, such as those that control the input value range or the output value range of the layer.

The method 200 continues by performing operations 208 through 214 with respect to a given quantized multiple fan-in layer in the set of quantized multiple fan-in layers. For some embodiments, operations 208 through 214 are performed for each quantized multiple fan-in layer in the set of quantized multiple fan-in layers. Operation 208 analyzes a set of preceding layers (e.g., all preceding layers) of the given quantized multiple fan-in layer, where each preceding layer in the set of preceding layers connects as input to the given quantized multiple fan-in layer. According to various embodiments, each preceding layer in the set of preceding layers is being analyzed to determine, for example, fan-in characteristics, fan-out characteristics, or both.

Thereafter, operation 210 determines, based on the analysis performed by operation 208, whether a condition is satisfied for updating (e.g., adjusting or setting) at least one preceding layer or the given quantized multiple fan-in layer in the set of preceding layers to remove normalization. As described herein, one example condition can comprise whether a number of fan-outs of each preceding layer (in the set of preceding layers) is one. Another example condition can comprise whether a number of fan-out of any preceding layer (in the set of preceding layers) is greater than one.

Based on operation 210 determining whether the condition is satisfied, operation 212 updates (e.g., adjusts or sets), the at least one preceding layer to remove normalization. Additionally, based on operation 210 determining whether the condition is satisfied, operation 214 updates (e.g., adjusts or sets) the given quantized multiple fan-in layer to remove normalization. For example, in response to operation 210 determining that a number of fan-outs of each preceding layer (in the set of preceding layers) is one, operation 212 can update an output value range of one or more of the preceding layers. For instance, operation 212 can update the output value range of one or more of the preceding layers (e.g., update maximum value of the output value range of those layers) based on a maximum value from output value ranges of all preceding layers connected as input to the given quantized multiple fan-in layer. Additionally, operation 214 can update the given quantized multiple fan-in layer to respectively match the updates to the one or more preceding layers. An example of this case is described above with respect to Example 1 and below with respect to FIG. 3.

As another example, in response to operation 210 determining that a number of fan-outs of any preceding layer in the set of preceding layers is greater than one, operation 212 can update one or more of the preceding layers (and operation 214 can update the given quantized multiple fan-in layer accordingly) based on one of several approaches. According to one approach, for a first preceding layer having a fan-out of one, the first output value range of the firm preceding layer can be updated based on a second output value range of a second preceding layer that has a fan-out greater than one. An example of this case is described above with respect to Example 2 and below with respect to FIG. 4.

According to an alternative approach, for the first preceding layer having a fan-out of one, the first output value range of the first preceding layer can be updated based on determining whether a first maximum value, of a first output value range of the first preceding layer, is greater than a second maximum value of a second output value range of a second preceding layer that has a fan-out greater than one. An example of this case is described above with respect to Example 3 and below with respect to FIG. 4. In response to the first maximum value being greater than the second maximum value, operation 212 can update the first output value range of the first preceding layer based on a maximum value of a third output value range of the given quantized multiple fan-in layer, and operation 214 can update the given quantized multiple fan-in layer to respectively match the updates to the one or more preceding layers. On the other hand, in response to the first maximum value not being greater than the second maximum value, operation 212 can update the first output value range of the first preceding layer based on the maximum value of the second output value range of the second preceding layer.

Eventually, the method 200 continues with operation 216 generating, based on the quantized neural network as updated by operations 212 and 214, executable code for operating a trained neural network model on a target hardware processor, where the trained neural network model implements the quantized neural network. As described herein, for some embodiments, the quantized neural network (e.g., a trained fixed-point neural network) represents a quantized version of the trained neural network (e.g., a trained floating-point neural network).

Figure 3:
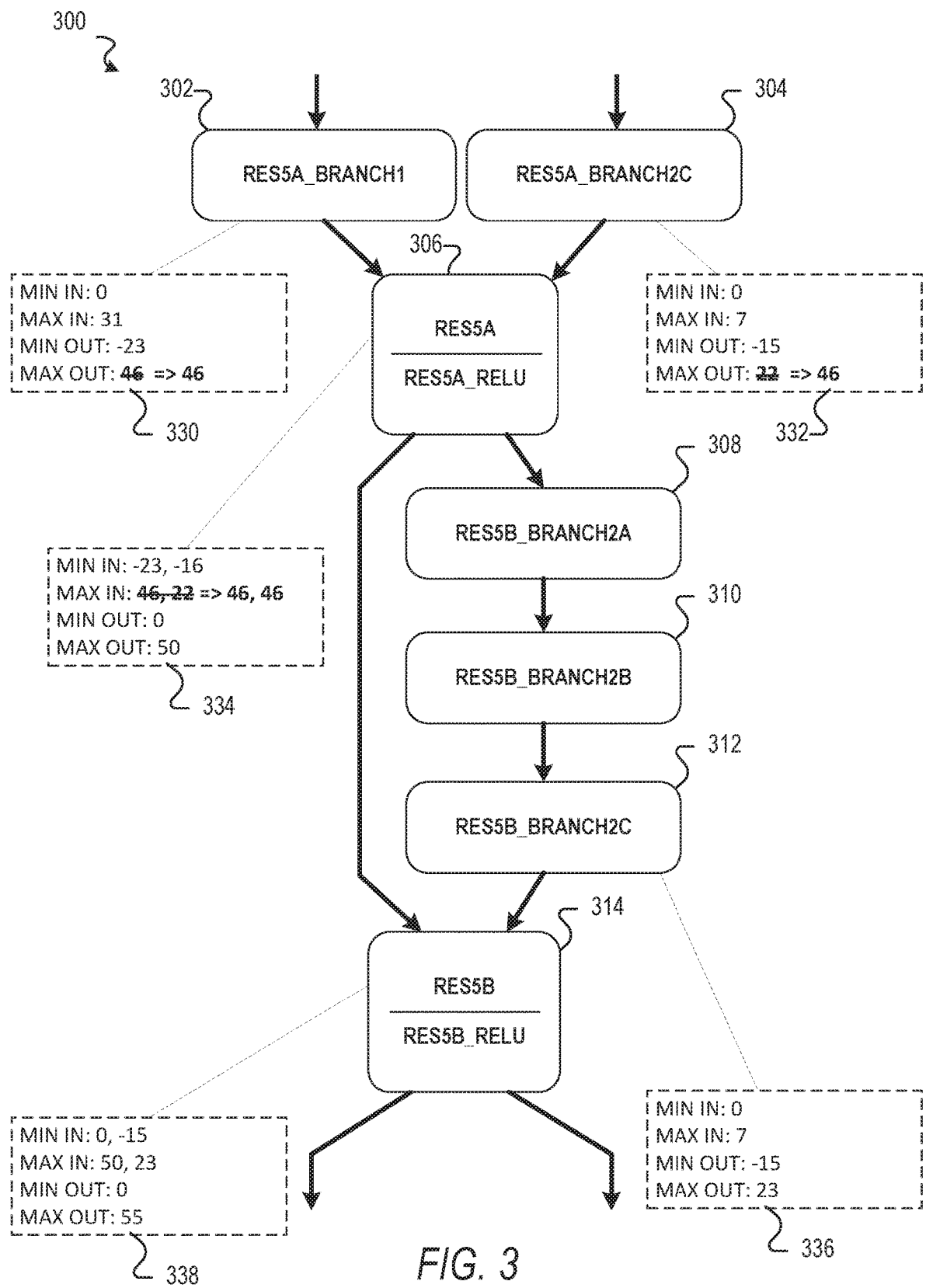
FIGS. 3 and 4 each illustrate an example of removing normalization from a portion of an example quantized neural network, according to some example embodiments.
Figure 4:
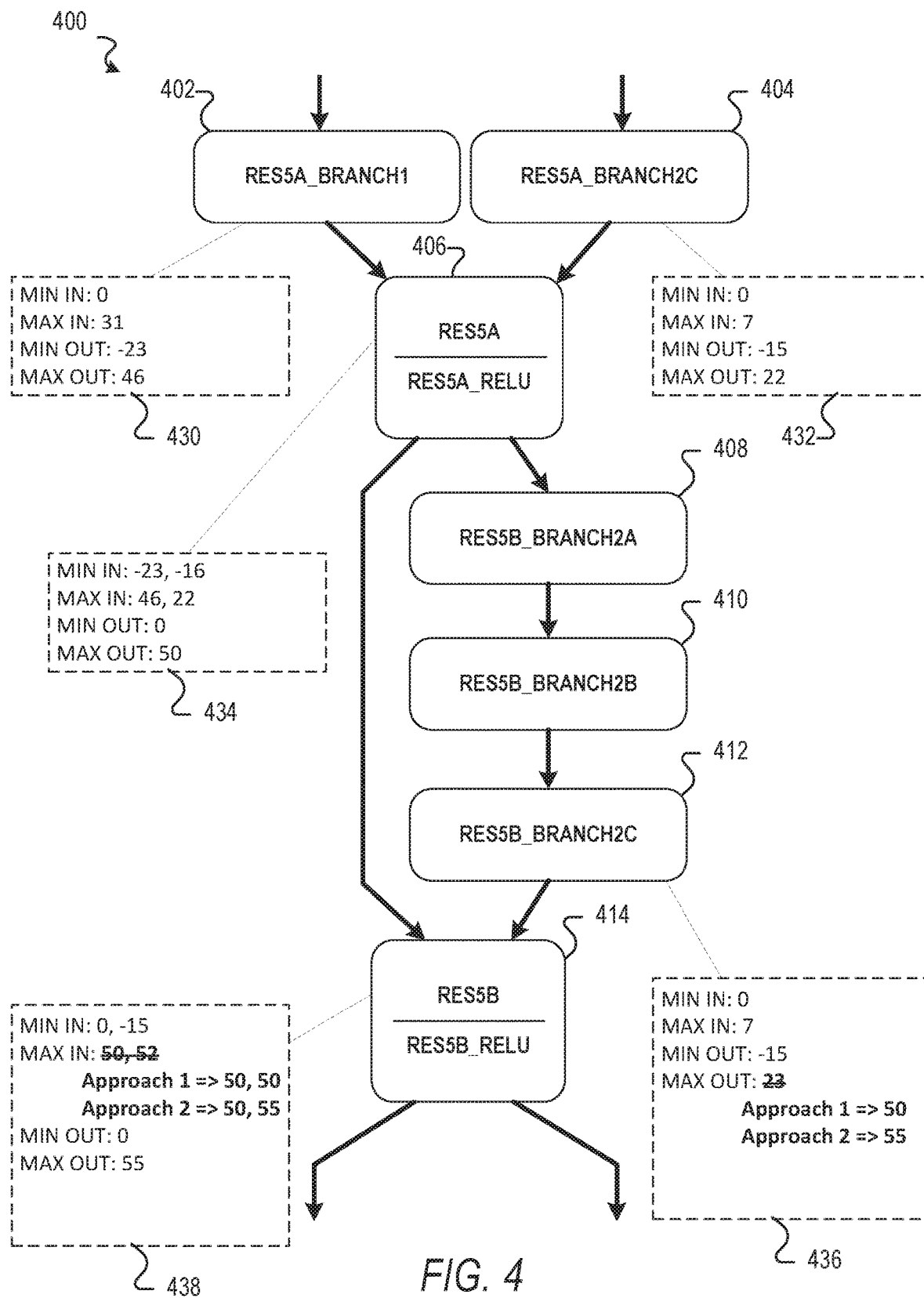

FIGS. 3 and 4 each illustrate a portion of an example of removing normalization from a portion of an example quantized neural network (e.g., fixed-point neural network), according to some example embodiments. Referring now to FIG. 3, a quantized neural network 300 comprises layers 302, 304, 308, 310, 312, and residual blocks 306, 314. One or more of the layers 302, 304, 308, 310, 312 can represent convolution layers. The residual block 306 comprises a quantized multiple fan-in layer (RES5A) and a rectified linear unit (RES5A_RELU) layer and, likewise, the residual block 314 comprises a quantized multiple fan-in layer (RES5B) and a rectified linear unit (RES5B_RELU) layer. As described herein, each of the quantized multiple fan-in layers can comprise an element-wise (eltwise) sum layer. According to some embodiments, the residual block 306 and preceding layers 302 and 304 represent a projection mapping, while the residual block 314 and preceding layers 308, 310 and 312 represent an identity mapping. The input/output value ranges (activations) of layer 302 are illustrated in parameter window 330, the input/output value ranges (activations) of layer 304 are illustrated in parameter window 332, the input/output value ranges (activations) of the residual block 306 (input value ranges of the two inputs of layer RES5A and output value range of layer RES5A_RELU) are illustrated in parameter window 334, the input/output value ranges (activations) of layer 312 are illustrated in parameter window 336, and the input/output value ranges (activations) of the residual block 314 (input value ranges of the two inputs of layer RES5B and output value range of layer RES5B_RELU) are illustrated in parameter window 338.

With respect to the quantized multiple fan-in layer RES5A of the residual block 306, some embodiments described herein can determine that each of the preceding layers 302 and 304 connected as inputs to the layer RES5A has a fan-out of one. In response, various embodiments can update the maximum value of the output value range of the layer 302 (MAX OUT: 46) and can update the maximum value of the output value range of the layer 304 (MAX OUT: 22) to be the maximum value of the two output value ranges (i.e., 46), as illustrated in parameter windows 330 and 332. Additionally, the maximum value of the input value range of the layer RES5A is updated to reflect the updates to the preceding layers 302 and 304, as illustrated in parameter window 334. As shown, the maximum value with respect to the layer 302 effectively remains unchanged in this example.

Referring now to FIG. 4, a quantized neural network 400 comprises layers 402, 404, 408, 410, 412, and residual blocks 406, 414. One or more of the layers 402, 404, 408, 410, 412 can represent convolution layers. The residual block 406 comprises a quantized multiple fan-in layer (RES5A) and a rectified linear unit (RES5A_RELU) layer and, likewise, the residual block 414 comprises a quantized multiple fan-in layer (RES5B) and a rectified linear unit (RES5B_RELU) layer. As described herein, each of the quantized multiple fan-in layers can comprise an element-wise (eltwise) sum layer. According to some embodiments, the residual block 406 and preceding layers 402 and 404 represent a projection mapping 1), while the residual block 414 and preceding layers 408, 410, 412 represent an identity mapping. The input/output value ranges (activations) of layer 402 are illustrated in parameter window 430, the input/output value ranges (activations) of layer 404 are illustrated in parameter window 432, the input/output value ranges (activations) of the residual block 406 (input value ranges of the two inputs of layer RES5A and output value range of layer RES5A_RELU) are illustrated in parameter window 434, the input/output value ranges (activations) of layer 412 are illustrated in parameter window 436, and the input/output value ranges (activations) of the residual block 414 (input value ranges of the two inputs of layer RES5B and output value range of layer RES5B_RELU) are illustrated in parameter window 438.

With respect to the quantized multiple fan-in layer RES5B of the residual block 406, some embodiments described herein can determine that the preceding layer RES5A_RELU has a fan-out greater than one and that the preceding layer 412 has a fan-out of one. As described herein, various embodiments can respond by one of several approaches. According to a first example approach (Approach 1), some embodiments can update the maximum value of the output value range of the layer 412 (MAX OUT: 23), which has a fan-out of one, to match the maximum value of the output value range of the layer RES5B_RELU (MAX OUT: 50), which has a fan out that is greater than one. Additionally, the maximum value of the input value range of the layer RES5B is updated to reflect the updates to the preceding layer 412. These updates are illustrated in parameter windows 436 and 438 as Approach 1.

According to a second example approach (Approach 2), some embodiments can update the maximum value of the output value range of the layer 412 (MAX OUT: 23), which has a fan-out of one, to match the maximum value of the output value range of the layer RES5B_RELU (MAX OUT: 55). Additionally, the maximum value of the input value range of the layer RES5B is updated to reflect the updates to the preceding layer 412. These updates are illustrated in parameter windows 436 and 438 as Approach 2.

Figure 5:
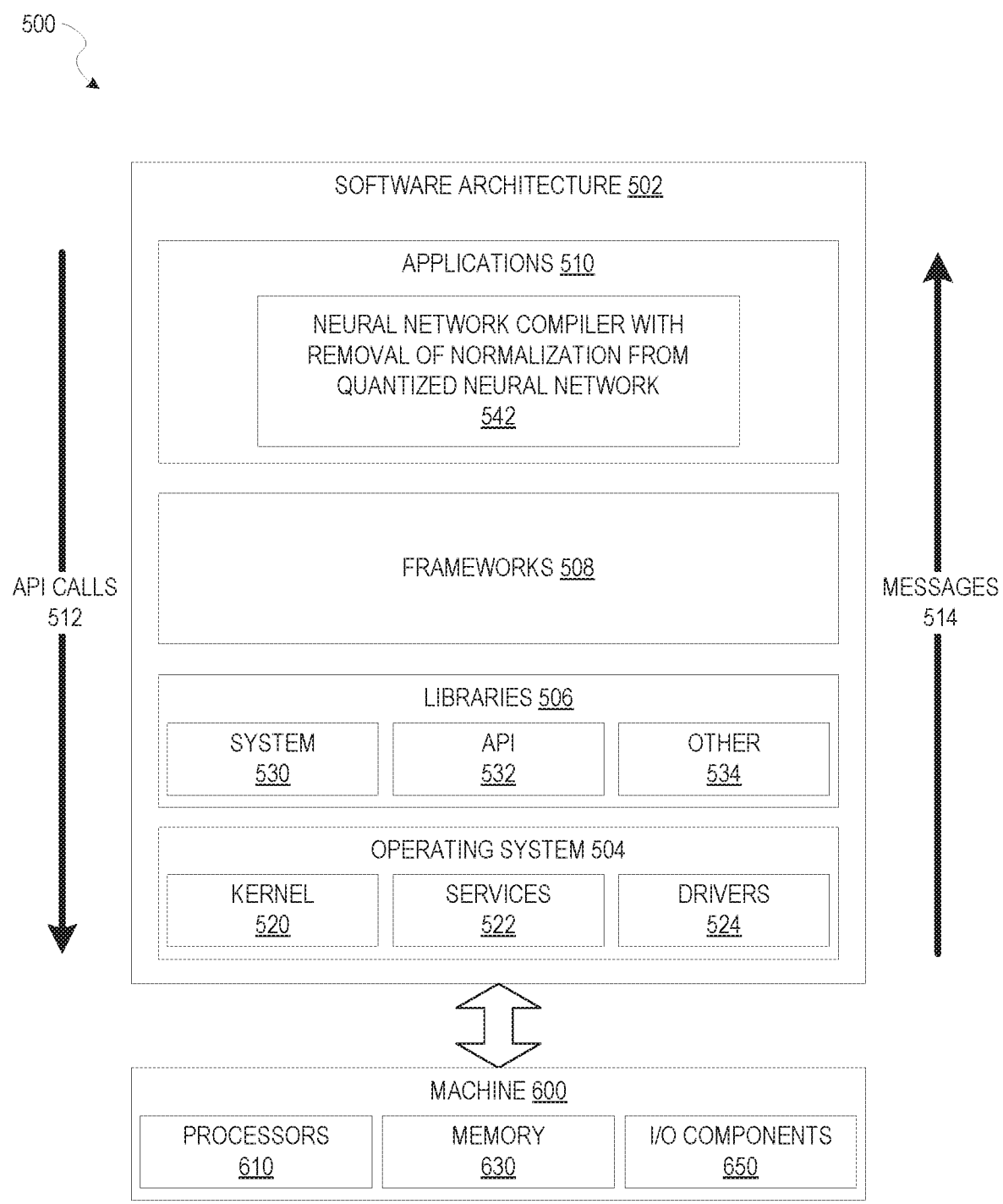
FIG. 5 is a block diagram illustrating an example of a software architecture that may be operating on a computing device and may be used with methods for quantizing trained neural networks with removal of normalization with respect to at least one layer of the quantized neural network, according to some example embodiments.

FIG. 5 is a block diagram 500 illustrating an example of a software architecture 502 that may be operating on a computer and may be used with methods for quantizing trained neural networks with removal of normalization with respect to at least one layer of the quantized neural network, according to some example embodiments. The software architecture 502 can be used as a computing device to implement any of the methods described above. Aspects of the software architecture 502 can, in various embodiments, quantize a trained neural network with removal of normalization with respect to at least one layer of the quantized neural network, such as a quantized multiple fan-in layer (e.g., element-wise add or sum layer). Additionally, aspects of the software architecture 502 can, in various embodiments, generate executable code from the resulting quantized trained neural network, where the executable code is executable by a target hardware processor (e.g., specialized processor, such as a DSP or an NPU) to operate the quantized trained neural network on the target hardware processor.

FIG. 5 is merely a non-limiting example of a software architecture 502, and it will be appreciated that many other architectures can be implemented to facilitate the functionality described herein. In various embodiments, the software architecture 502 is implemented by hardware such as a machine 600 of FIG. 6 that includes processors 610, memory 630, and I/O components 650. In this example, the software architecture 502 can be conceptualized as a stack of layers where each layer may provide a particular functionality. For example, the software architecture 502 includes layers such as an operating system 504, libraries 506, software frameworks 508, and applications 510. Operationally, the applications 510 invoke application programming interface (API) calls 512 through the software stack and receive messages 514 in response to the API calls 512, consistent with some embodiments. In various embodiments, any client device, any server computer of a server system, or any other device described herein may operate using elements of the software architecture 502. A computing device described herein may additionally be implemented using aspects of the software architecture 502, with the software architecture 502 adapted for operating to quantize a trained neural network in any manner described herein.

In one embodiment, an application of the applications 510 compiles (e.g., maps) a trained neural network to code executable by a target hardware processor (e.g., specialized processor, such as a DSP or an NPU) to operate the quantized trained neural network according to embodiments described herein using various modules within the software architecture 502. For example, in one embodiment, a computing device similar to the machine 600 includes the memory 630 and the one or more processors 610. The processors 610 also implement a neural network compiler with removal of normalization from quantized neural network 542 (hereafter, neural network compiler 542) for quantizing a trained neural network with removal of normalization with respect to at least one layer of the quantized neural network (e.g., quantized multiple fan-in layer), and for generating executable code from the resulting quantized trained neural network in accordance with various embodiments described herein.

In various other embodiments, rather than being implemented as modules of the one or more applications 510, the neural network compiler 542 can be implemented using elements of the libraries 506, the operating system 504, or the software frameworks 508.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, signal-processing drivers to optimize modeling computation, memory drivers, serial communication drivers (e.g., Universal Serial Bus (USB) drivers), WI-FIR drivers, audio drivers, power management drivers, and so forth.

In some embodiments, the libraries 506 provide a low-level common infrastructure utilized by the applications 510. The libraries 506 can include system libraries 530 such as neural network libraries used by the neural network compiler 542 or other libraries that can provide functions such as memory allocation functions, string manipulation functions, mathematic functions, and the like. In addition, the libraries 506 can include API libraries 532 such as media libraries (e.g., libraries to support presentation and manipulation of various media formats such as Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 506 may also include other libraries 534.

The software frameworks 508 provide a high-level common infrastructure that can be utilized by the applications 510, according to some embodiments. For example, the software frameworks 508 provide various graphic user interface (GUI) functions, high-level resource management, high-level location services, and so forth. The software frameworks 508 can provide a broad spectrum of other APIs that can be utilized by the applications 510, some of which may be specific to a particular operating system 504 or platform.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or Output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers examples of machines 600 including processors 610), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 600, but deployed across a number of machines 600. In some example embodiments, the processors 610 or processor-implemented modules are located in a single geographic location (e.g., within a home environment, an office environment, or a server farm). In other example embodiments, the processors or processor-implemented modules are distributed across a number of geographic locations.

Figure 6:
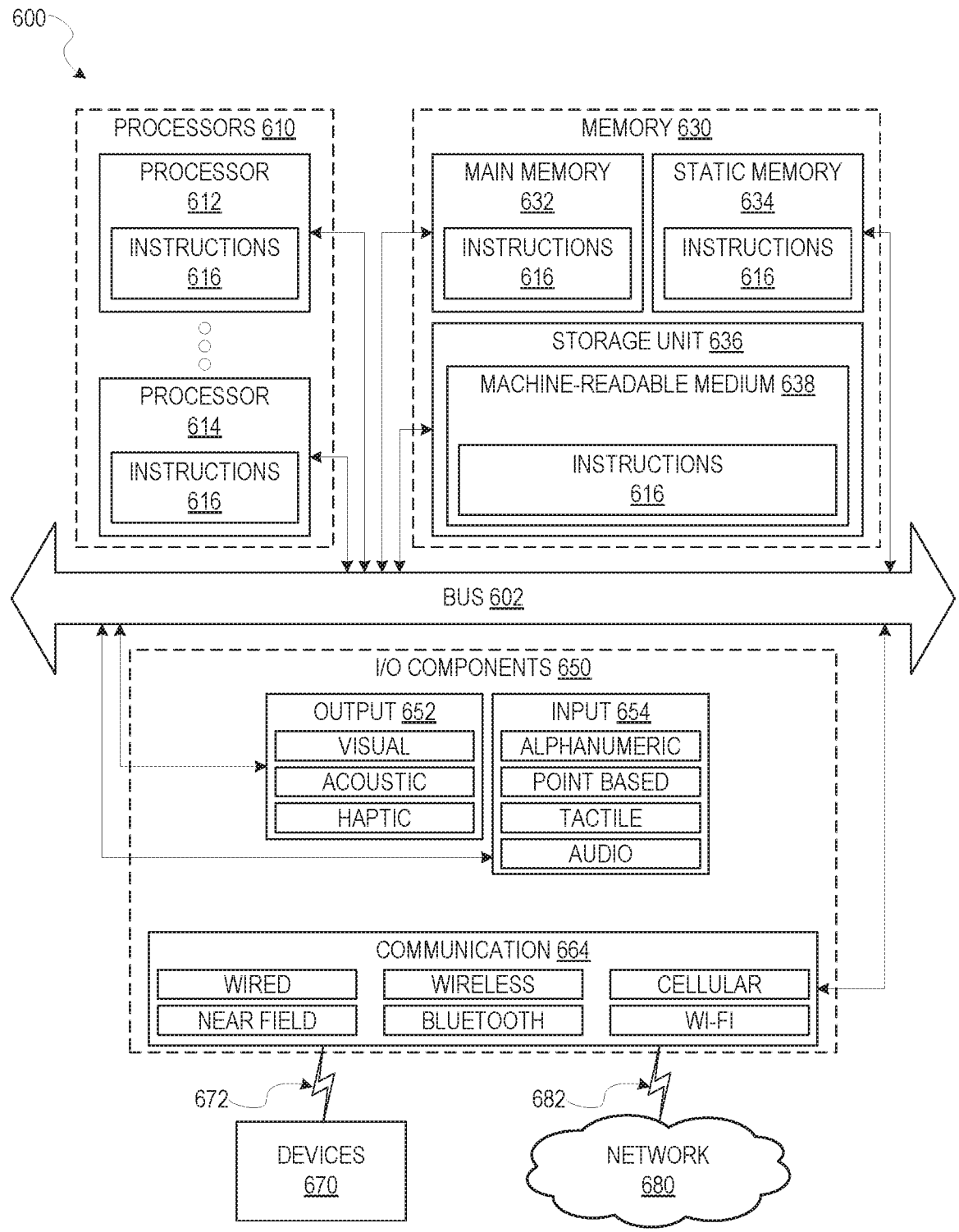
FIG. 6 is a diagram representing a machine in the form of a computer system within which a set of instructions are executed, causing the machine to perform any one or more of the methods discussed herein, according to some example embodiments.

FIG. 6 is a diagrammatic representation of the machine 600 in the form of a computer system within which a set of instructions may be executed for causing the machine 600 to perform any one or more of the methodologies discussed herein, according to an example embodiment. FIG. 6 shows components of the machine 600, which is, according to some embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein can be executed. In alternative embodiments, the machine 600 operates as a standalone device or can be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 can comprise, but not be limited to, a server computer, a client computer, a personal computer (PC), a tablet computer, a laptop computer, a netbook, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

In various embodiments, the machine 600 comprises processors 610, memory 630, and I/O components 650, which can be configured to communicate with each other via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 612 and a processor 614 that may execute the instructions 616. The term "processor" is intended to include multi-core processors 610 that may comprise two or more independent processors 612, 614 (also referred to as "cores") that can execute the instructions 616 contemporaneously. Although FIG. 6 shows multiple processors 610, the machine 600 may include a single processor 612 with a single core, a single processor 612 with multiple cores (e.g., a multi-core processor 612), multiple processors 610 with a single core, multiple processors 610 with multiple cores, or any combination thereof.

The memory 630 comprises a main memory 632, a static memory 634, and a storage unit 636 accessible to the processors 610 via the bus 602, according to some embodiments. The storage unit 636 can include a machine-readable medium 638 on which are stored the instructions 616 embodying any one or more of the methodologies or functions described herein. The instructions 616 can also reside, completely or at least partially, within the main memory 632, within the static memory 634, within at least one of the processors 610 (e.g., within the processor's cache memory), or any suitable combination thereof, during execution thereof by the machine 600. Accordingly, in various embodiments, the main memory 632, the static memory 634, and the processors 610 are considered machine-readable media 638.

As used herein, the term "memory" refers to a machine-readable medium 638 able to store data temporarily or permanently and may be taken to include, but not be limited to, random-access memory (RAM), read-only memory (ROM), buffer memory, flash memory, and cache memory. While the machine-readable medium 638 is shown, in an example embodiment, to be a single medium, the term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., the instructions 616) for execution by a machine (e.g., the machine 600), such that the instructions, when executed by one or more processors of the machine (e.g., the processors 610), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 650 include a wide variety of components to receive input, provide output, produce output, transmit information, exchange information, capture measurements, and so on. In general, it will be appreciated that the I/O components 650 can include many other components that are not shown in FIG. 6. The I/O components 650 are grouped according to functionality merely for simplifying the following discussion, and the grouping is in no way limiting. In various example embodiments, the I/O components 650 include output components 652 and input components 654. The output components 652 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 654 include alphanumeric input components (e.g., a keyboard, a touch screen configured to receive alphanumeric input, a photo-optical keyboard, or other alphanumeric input components), point-based input components (e.g., a mouse, a touchpad, a trackball, or other pointing instruments), tactile input components (e.g., a physical button, a touch screen that provides location and force of touches or touch gestures, or other tactile input components audio input components (e.g., a microphone), and the like.

Communication can be implemented using a wide variety of technologies. The I/O components 650 may include communication components 664 operable to couple the machine 600 to a network 680 or devices 670 via a coupling 682 and a coupling 672, respectively. For example, the communication components 664 include a network interface component or another suitable device to interface with the network 680. In further examples, the communication components 664 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 670 may be another machine or any of a wide variety of peripheral devices (e.g., a peripheral device coupled via a USB).

In various example embodiments, one or more portions of the network 680 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FIR network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling.

Furthermore, the machine-readable medium 638 is non-transitory (in other words, not having any transitory signals) in that it does not embody a propagating signal. However, labeling the machine-readable medium 638 "non-transitory" should not be construed to mean that the machine-readable medium 638 is incapable of movement; the machine-readable medium 638 should be considered as being transportable from one physical location to another. Additionally, since the machine-readable medium 638 is tangible, the machine-readable medium 638 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may lye made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method comprising:
accessing, by a hardware processor, source model data that describes a trained neural network that processes data in a floating-point domain, the trained neural network comprising a set of floating-point layers;
converting, by the hardware processor, the trained neural network to a quantized neural network that processes data in a fixed-point domain by generating the quantized neural network based on the source model data, the quantized neural network comprising a set of fixed-point layers that corresponds to the set of floating-point layers;
determining, by the hardware processor, a set of quantized multiple fan-in layers in the quantized neural network; and
for a given quantized multiple fan-in layer in the set of quantized multiple fan-in layers:
analyzing, by the hardware processor, a set of preceding layers of the given quantized multiple fan-in layer, the set of preceding layers connecting as input to the given quantized multiple fan-in layer;
determining, by the hardware processor and based on the analyzing of the set of preceding layers, whether a condition is satisfied for updating at least one preceding layer in the set of preceding layers to remove normalization, the condition relating to a number of fan-out of one or more preceding layer in the set of preceding layers; and
updating, by the hardware processor and based on the determining whether the condition is satisfied, the at least one preceding layer to remove normalization.

2. The method of claim 1, wherein the given quantized multiple fan-in layer comprises an element-wise sum layer.

3. The method of claim 1, wherein the given quantized multiple fan-in layer forms part of a residual block of the quantized neural network.

4. The method of claim 1, wherein the condition is that the number of fan-out of each preceding layer in the set of preceding layers is one.

5. The method of claim 4, wherein the updating of the at least one preceding layer to remove normalization comprises:
in response to determining that the condition is satisfied, updating a given output value range of the at least one preceding layer.

6. The method of claim 5, wherein the updating of the given output value range of the at least one preceding layer comprises:
updating the given output value range based on a maximum value from output value ranges of all preceding layers connected as input to the given quantized multiple fan-in layer.

7. The method of claim 1, wherein the condition is that the number of fan-out of any preceding layer in the set of preceding layers is greater than one.

8. The method of claim 7, wherein the updating of the at least one preceding layer to remove normalization comprises:
in response to determining that the condition is satisfied, for a first preceding layer connected as input to the given quantized multiple fan-in layer and having a fan-out of one, updating a first output value range of the first preceding layer based on a second output value range of a second preceding layer that has a fan-out greater than one.

9. The method of claim 7, wherein the updating of the at least one preceding layer to remove normalization comprises:
in response to determining that the condition is satisfied, for a first preceding layer connected as input to the given quantized multiple fan-in layer and having a fan-out of one:
determining whether a first maximum value, of a first output value range of the first preceding layer, is greater than a second maximum value of a second output value range of a second preceding layer that has a fan-out greater than one; and
updating the first output value range of the first preceding layer based on the determining whether the first maximum value is greater than the second maximum value.

10. The method of claim 9, wherein the updating of the first output value range of the first preceding layer based on the determining whether the first maximum value is greater than the second maximum value comprises:
in response to the first maximum value being greater than the second maximum value, updating the first output value range of the first preceding layer based on a third maximum value of a third output value range of the given quantized multiple fan-in layer.

11. The method of claim 9, wherein the updating of the first output value range of the first preceding layer based on the determining whether the first maximum value is greater than the second maximum value comprises:
in response to the first maximum value not being greater than the second maximum value, updating the first output value range of the first preceding layer based on the second maximum value of the second output value range of the second preceding layer.

12. The method of claim 1, further comprising:
updating, by the hardware processor and based on the determining whether the condition is satisfied, the given quantized multiple fan-in layer to remove normalization.

13. The method of claim 12, wherein the condition is that a number of fan-out of each preceding layer in the set of preceding layers is one, the updating of the given quantized multiple fan-in layer to remove normalization comprising:
in response to determining that the condition is satisfied, updating an input value range of the given quantized multiple fan-in layer.

14. The method of claim 13, wherein the updating of the input value range of the given quantized multiple fan-in layer comprises:
updating the input value range of the given quantized multiple fan-in layer based on a maximum value from output value ranges of all preceding layers connected as input to the given quantized multiple fan-in layer.

15. The method of claim 12, wherein the condition is that a number of fan-out of any preceding layer in the set of preceding layers is greater than one, the updating of the given quantized multiple fan-in layer to remove normalization comprising:

in response to determining that the condition is satisfied, updating an input value range of the given quantized multiple fan-in layer based on a given output value range of a given preceding layer that has a fan-out greater than one.

16. The method of claim 12, wherein the condition is that a number of fan-out of any preceding layer in the set of preceding layers is greater than one, the updating of the given quantized multiple fan-in layer to remove normalization comprising:

in response to determining that the condition is satisfied, for a first preceding layer connected as input to the given quantized multiple fan-in layer and having a fan-out of one:

determining whether a first maximum value, of a first output value range of the first preceding layer, is greater than a second maximum value of a second output value range of a second preceding layer that has a fan-out greater than one; and updating an input value range of the given quantized multiple fan-in layer based on the determining whether the first maximum value is greater than the second maximum value.

17. The method of claim 16, wherein the updating of the input value range of the given quantized multiple fan-in layer based on the determining whether the first maximum value is greater than the second maximum value comprises:

in response to the first maximum value being greater than the second maximum value, updating the input value range of the given quantized multiple fan-in layer based on a third maximum value of a third output value range of the given quantized multiple fan-in layer.

18. The method of claim 16, wherein the updating of the input value range of the given quantized multiple fan-in layer based on the determining whether the first maximum value is greater than the second maximum value comprises:

in response to the first maximum value not being greater than the second maximum value, updating the input value range of the given quantized multiple fan-in layer based on the second maximum value of the second output value range of the second preceding layer.

19. A device comprising:

a memory storing instructions; and a hardware processor communicatively coupled to the memory and configured by the instructions to perform operations comprising:

converting a trained neural network that processes data in a floating-point domain to a quantized neural network that processes data in a fixed-point domain, the trained neural network comprising a set of floating-point layers, the quantized neural network comprising a set of fixed-point layers that corresponds to the set of floating-point layers;

determining a set of quantized multiple fan-in layers in the quantized neural network; and for a given quantized multiple fan-in layer in the set of quantized multiple fan-in layers:

analyzing a set of preceding layers of the given quantized multiple fan-in layer, the set of preceding layers connecting as input to the given quantized multiple fan-in layer;

determining, based on the analyzing of the set of preceding layers, whether a condition is satisfied for updating at least one preceding layer in the set of preceding layers to remove normalization, the condition relating to a number of fan-out of one or more preceding layer in the set of preceding layers; and updating, based on the determining whether the condition is satisfied, the at least one preceding layer to remove normalization.

20. A non-transitory computer-readable medium comprising instructions that, when executed by a hardware processor of a device, cause the device to perform operations comprising:

converting a trained neural network that processes data in a floating-point domain to a quantized neural network that processes data in a fixed-point domain, the trained neural network comprising a set of floating-point layers, the quantized neural network comprising a set of fixed-point layers that corresponds to the set of floating-point layers;

determining a set of quantized multiple fan-in layers in the quantized neural network;

for a given quantized multiple fan-in layer in the set of quantized multiple fan-in layers:

analyzing a set of preceding layers of the given quantized multiple fan-in layer, the set of preceding layers connecting as input to the given quantized multiple fan-in layer;

determining, based on the analyzing of the set of preceding layers, whether a condition is satisfied for updating at least one preceding layer in the set of preceding layers to remove normalization; and updating, based on the determining whether the condition is satisfied, the at least one preceding layer to remove normalization, the condition relating to a number of fan-out of one or more preceding layer in the set of preceding layers; and generating, based on the quantized neural network as updated, executable code for operating a trained neural network model on a target hardware processor, the trained neural network model implementing the quantized neural network.

* * * * *